W. A. LEWIS.
TRUCK.
APPLICATION FILED MAR. 7, 1917.

1,261,945.

Patented Apr. 9, 1918.

Inventor
William A. Lewis.
By Milo R. Stevens Co.
Attorneys

UNITED STATES PATENT OFFICE.

WILLIAM A. LEWIS, OF COLBERT, OKLAHOMA.

TRUCK.

1,261,945.  Specification of Letters Patent.  Patented Apr. 9, 1918.

Application filed March 7, 1917. Serial No. 153,031.

*To all whom it may concern:*

Be it known that I, WILLIAM A. LEWIS, a citizen of the United States, residing at Colbert, in the county of Bryan and State of Oklahoma, have invented new and useful Improvements in Trucks, of which the following is a specification.

The truck which is the subject matter of the present application for patent is intended primarily for use by cotton pickers to support the bag in which the picked cotton is placed, and the object of the invention is to provide a truck of this kind which provides a convenient support for the bag and which can be easily handled.

The invention also has for its object to provide the truck with a means whereby it is prevented from getting stalled by the wheels thereof sinking too far into the ground when the latter is soft.

The objects stated are attained by means of a novel combination and arrangement of parts to be hereinafter described and claimed, and in order that the same may be better understood, reference is had to the accompanying drawing forming a part of this specification.

In the drawing

Figure 1:
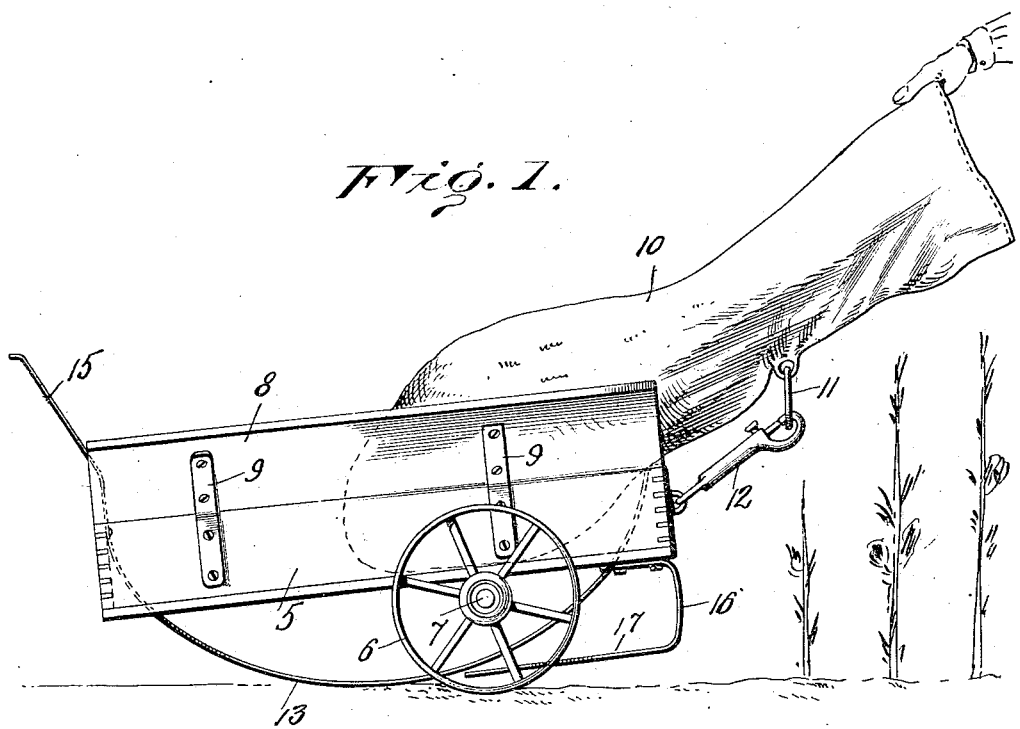
Figure 1 is a side elevation of the truck.
Figure 2:
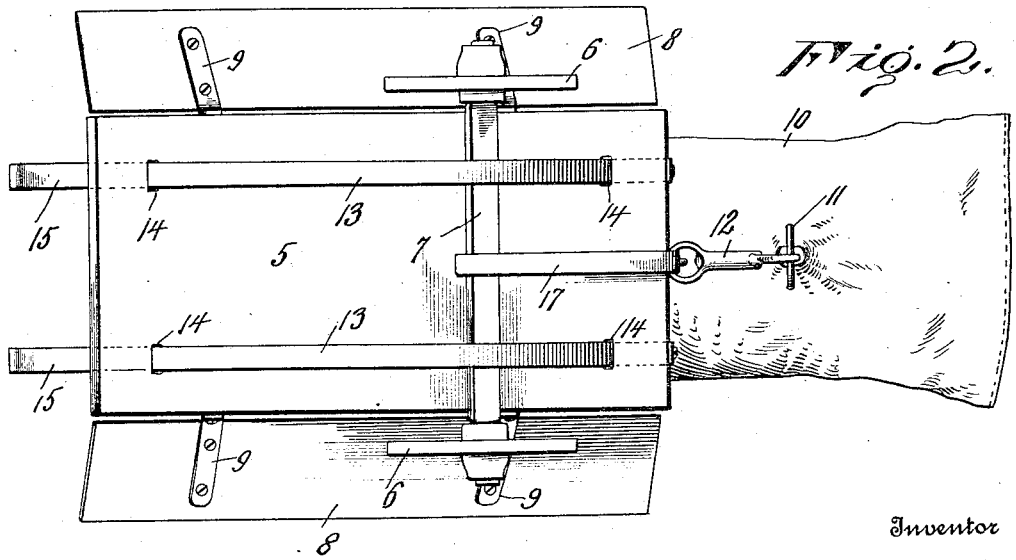
Fig. 2 is an inverted plan view thereof.

Referring specifically to the drawing, the truck is composed of a box-shaped body 5 mounted on a pair of wheels 6, the latter running freely on an axle 7 mounted on the bottom of the body. The side walls of the body have outwardly sloping extension boards 8 fastened to said walls by straps 9 or other suitable means.

The bag in which the picked cotton is placed is shown at 10 and it is supported by being placed on the truck in the box-like body 5 thereof, the side boards 8 serving to prevent the bag from slipping sidewise out of the box. The truck is hauled along the rows of plants by attaching the bag to the front end of the truck and by pulling on the bag. The attachment is made by providing the bag with a ring 11 and attaching a snap hook 12 or other suitable fasteners to the front end of the truck, and detachably engaging said hook or fastener with the ring.

From the bottom of the truck body 5 depend two laterally spaced guard strips 13 extending in the direction of the length of the truck. These strips extend downwardly below the axle 7 such a distance that they come in contact with the surface of the ground, when the wheels 6 sink into the ground a certain distance, and they then serve as runners to support the truck body and to prevent the wheels from sinking farther into the ground. The truck can therefore be hauled over soft ground without danger of getting stalled by the wheels sinking too far into the ground.

The strips 13 are bowed as shown in Fig. 1 and their ends pass through apertures 14 in the bottom of the truck body 5 near the ends of the latter, the ends of the strips then passing into the box forming the truck body and being suitably fastened to the front and rear end walls thereof. The rear ends of the strips rise a suitable distance from the top of the rear wall of the truck body, as shown at 15, to serve as guards to prevent the bag 10 from slipping out of this end of the box.

The forward end of the truck body also has a depending prop to limit the downward tilt of this end of the body. This prop is a strip 16 which is fastened on the bottom of the truck body and has a rearwardly extending foot portion 17 adapted to come in contact with the ground for the purpose stated.

The preferred embodiment of the invention has been shown, but it will be understood that various changes and modifications may be made without a departure from the spirit and scope of the invention as claimed hereinafter.

I claim:—

A truck comprising a body, wheels supporting the body, and laterally spaced downwardly bowed runners carried by the body and extending in the direction of the length thereof and below the axle of the wheels to limit the penetration of the wheels into the ground, the bottom of the body having apertures through which the ends of the runners pass, the rear ends of the runners rising above the top of the corresponding end of the body.

In testimony whereof I affix my signature.

WILLIAM A. LEWIS.